United States Patent [19]

Noguchi et al.

[11] Patent Number: 4,681,078
[45] Date of Patent: Jul. 21, 1987

[54] AIR-FUEL RATIO CONTROL SYSTEM FOR AN INTERNAL COMBUSTION ENGINE

[75] Inventors: Kunio Noguchi, Wako; Atsushi Totsune, Hoya; Koji Kajita, Niiza; Takefumi Hosaka, Asaka, all of Japan

[73] Assignee: Honda Giken Kogyo Kabushiki Kaisha, Tokyo, Japan

[21] Appl. No.: 736,735

[22] Filed: May 22, 1985

[30] Foreign Application Priority Data

May 25, 1984 [JP] Japan ................. 59-106216

[51] Int. Cl.⁴ ............................................. F02M 7/00
[52] U.S. Cl. ................................. 123/490; 123/589; 123/440
[58] Field of Search ............... 123/438, 440, 589, 490, 123/489

[56] References Cited

U.S. PATENT DOCUMENTS

| | | | |
|---|---|---|---|
| 4,335,693 | 6/1982 | Cowles | 123/438 |
| 4,364,354 | 12/1982 | Kosuge | 123/438 |
| 4,407,247 | 10/1983 | Masaki | 123/438 |
| 4,416,236 | 11/1983 | Morozumi | 123/438 |
| 4,480,618 | 11/1984 | Kamifuji | 123/438 |
| 4,572,149 | 2/1986 | Hasegawa | 123/440 |
| 4,584,979 | 4/1986 | Fujimura | 123/438 |

Primary Examiner—Ronald B. Cox
Attorney, Agent, or Firm—Pollock, Vande Sande & Priddy

[57] ABSTRACT

An air-fuel ratio control system for an internal combustion engine having a carburetor with a slow speed circuit, includes a feedback control means by which an air intake side secondary air is supplied to the carburetor, on the downstream side of the throttle valve, in response to a result of detection of air-fuel ratio in terms of the oxygen concentration in the exhaust gas of the engine. Under a predetermined operating condition of the engine, the feedback control of the air-fuel ratio by means of the control of the air intake side secondary air is performed while the supply of the fuel through the slow speed circuit of the fuel supply system is controlled in response to the result of the detection of the air-fuel ratio. In a variation of the system, the supply of the fuel through the slow speed circuit is stopped during the predetermined operating condition of the engine.

2 Claims, 4 Drawing Figures

AIR-FUEL RATIO CONTROL SYSTEM FOR AN INTERNAL COMBUSTION ENGINE

BACKGROUND OF THE INVENTION

1. Field of the Invention

The present invention relates to an air-fuel ratio control system for an internal combustion engine.

2. Description of Background Information

In internal combustion engines provided with a three-way catalytic converter in the exhaust system, it is customary to use an air-fuel ratio control system in which the air-fuel ratio of the mixture supplied to the engine is controlled around a stoichometric value (14.7 : 1 for example) according to the composition of the exhaust gas and operating conditions of the engine. This is because optimum operation of the three-way catalytic converter is enabled at the stoichometric air-fuel ratio. As an example of this type of air-fuel ratio control system, Japanese Patent application No. 57-217548 discloses an air-fuel ratio control system of the air intake side secondary air supply system type which is constructed such that an oxygen sensor is provided in an exhaust system of the engine, and the feedback control of the air-fuel ratio is performed such that an amount of air intake side secondary air flowing through an air intake side secondary air supply passage leading to the downstream side of the throttle valve is varied in response to the output signal of the oxygen sensor.

However, in this conventional air-fuel ratio control system having the feature of the supply of the air intake side secondary air, there was a tendency for the operation of the system during the feedback control under a high load condition to become inaccurate. Under such a condition, the magnitude of the vacuum downstream of the throttle valve, i.e., the intake manifold, becomes small. Therefore, the amount of the secondary air introduced into the intake manifold per unit time becomes smaller than the corresponding amount under the light or medium load condition even though the sectional area of the air intake side secondary air supply passage is constant. As a result, the air-fuel ratio of the mixture becomes over-rich and the amount of the noxious component, especially CO (carbon monoxide) and HC (hydrocarbon), emitted through the exhaust gas is increased.

SUMMARY OF THE INVENTION

An object of the present invention is therefore to provide an air-fuel ratio control system in which the generation of the over-rich mixture during the high load condition of the engine is prevented so that the efficiency of the purification of the exhaust gas is greatly improved.

According to an embodiment of the present invention, the air-fuel ratio control system is so constructed that under a predetermined operating condition of the engine, the system performs a feedback control of air-fuel ratio of the air intake side secondary air supply type, in which the supply of the air intake side secondary air is controlled in response to a result of the detection of the air-fuel ratio in terms of the composition of the exhaust gas, and the operation of a slow speed circuit of the fuel supply system is controlled in response to the result of the detection of the air-fuel ratio.

According to another embodiment of the present invention, under the predetermined operating condition of the engine, the system performs the feedback control of the air-fuel ratio of the air intake side secondary air supply type, and the operation of the slow speed circuit of the fuel supply system is stopped.

Further scope and applicability of the present invention will become apparent from the detailed description given thereinafter. However, it should be understood that the detailed description and specific examples, while indicating preferred embodiments of the invention, are given by way of illustration only, since various changes and modifications within the spirit and scope of the invention will become apparent to those skilled in the air from this detailed description.

DETAILED DESCRIPTION OF PREFERRED EMBODIMENTS

The preferred embodiments of the present invention will be described hereinafter with reference to the accompanying drawings.

Figure 1:
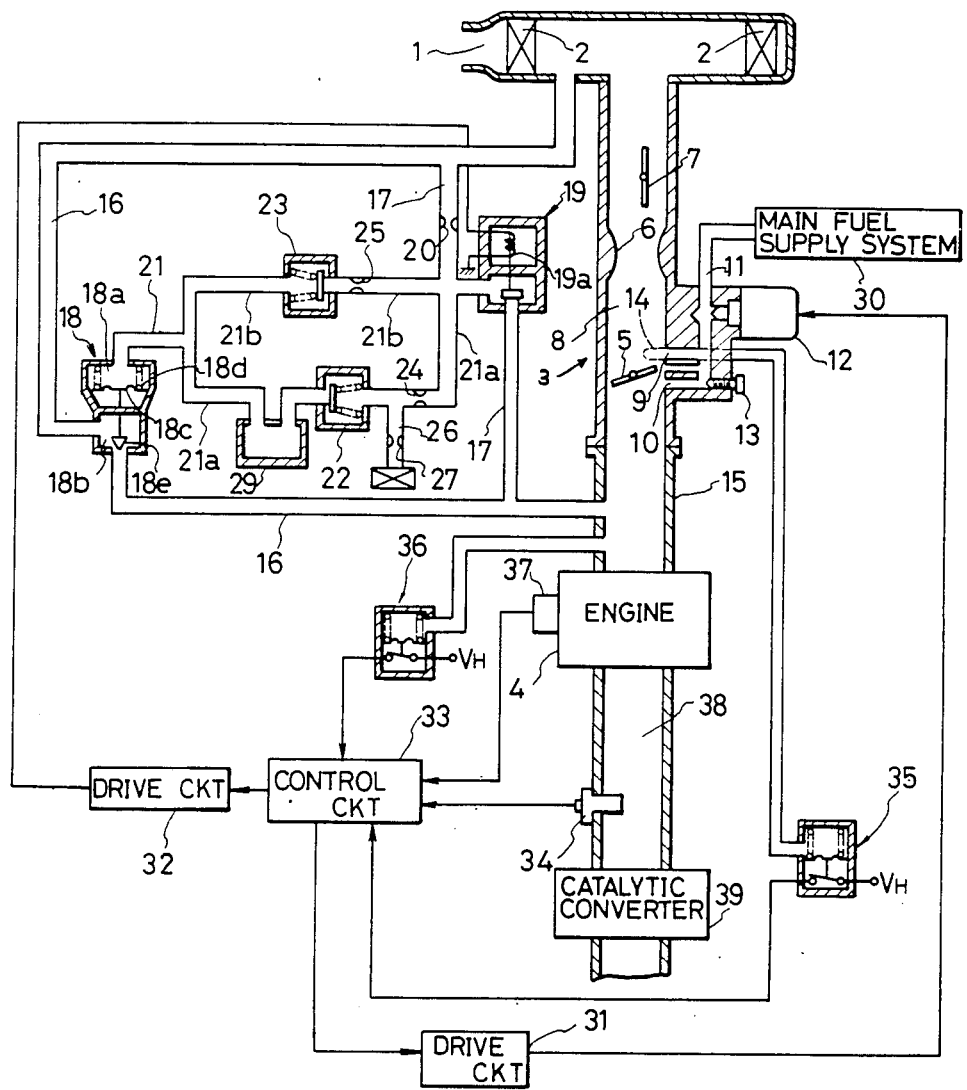
FIG. 1 is a schematic diagram illustrating the construction of an embodiment of the air-fuel ratio control system of the present invention.

In FIG. 1, the intake air taken at an atmospheric air inlet port 1 is drawn into an internal combustion engine through an air cleaner 2, and a carburetor 3. The carburetor 3 has a throttle valve 5 and a venturi 6 formed on the upstream side of the throttle valve 5. A choke valve 7 is provided on the upstream side of the venturi 6. In an inner wall 8 of the bore of the carburetor 3 near the throttle valve 5, a slow port 9 and an idle port 10 of a slow speed circuit of the fuel supply system are provided. The slow port 9 and the idle port 10 are communicated to a slow speed fuel supply passage 11 (for the slow speed operation) to which the fuel is branched off from a main fuel supply system 30. The slow speed fuel supply passage 11 is provided with a solenoid valve 12 which closes the slow speed fuel supply passage 11 when energized. Further, in the slow speed fuel supply passage 11 is provided, at a position near the idle port 10, with an idle adjust screw 13 for adjusting the amount of fuel supplied to the idle port 10.

In the inner wall 8 of the throttle bore, of substantially the same circumferential level as the slow port 9, a vacuum detection hole 14 is provided in such a manner that it is on the upstream side of the throttle valve 5 when the latter is closed and on the downstream side of the throttle valve 5 when the latter is opened.

Downstream of the throttle valve 5, an intake manifold 15, and the inside of the air cleaner 2, near an air outlet port, are mutually communicated via a pair of intake side secondary air supply passages 16 and 17. The secondary air supply passage 16 is provided with an air control valve 18 which is made up of a vacuum chamber 18a, a valve chamber 18b, a diaphragm 18c, a valve spring 18d, and a valve element 18e having a tapered form. The air control valve 18 varies the sectional area of the secondary air supply passage 16 in accordance with the magnitude of a vacuum supplied to the vacuum chamber 18a, so that the area of the passage increases as the magnitude of the vacuum increases.

The air intake side secondary air supply passage 17 is provided with a solenoid valve 19 having a solenoid 19a. When the solenoid 19a is deenergized, the air intake side secondary air supply passage 17 is closed and communication therethrough is made when the solenoid 19a is energized. An orifice 20 is provided in the air intake side secondary air supply passage 17, on the upstream side of the solenoid valve 19. In addition, the air intake side secondary air supply passages 16 and 17 may be respectively formed as a shunt passage communicated to the intake manifold 15, as shown in the figure.

A part of the air intake side secondary air supply passage 17 between the solenoid valve 19 and the orifice 20 is communicated with the pressure chamber 18a of the air control valve 18 by way of a pressure supply passage 21. The pressure supply passage 21 has a part in the form of parallel branches, i.e., pressure supply passages 21a and 21b. The pressure supply passage 21a is provided with a surge tank 29, and a non-return valve 22 which is located before the surge tank 29 and past the secondary air supply passage 17. The non-return valve 22 allows only an air flow from the vacuum chamber 18a directed to the air intake side secondary air supply passage 17, i.e., the vacuum directed to the vacuum chamber 18a. Also, a non-return valve 23 is provided in the pressure supply passage 21b so as to allow only an air flow directed to the vacuum chamber 18a. The pressure supply passages 21a, 21b are provided with orifices 24 and 25 respectively, before the non-return valve 22 or 23 and past the secondary air supply passage 17. A part of the pressure supply passage 21a, between the non-return valve 22 and the orifice 24, is communicated to the atmosphere through an atmospheric pressure supply passage 26 in which an orifice 27 is provided.

The solenoid valves 12 and 19 are connected to a control circuit 33 through drive circuits 31 and 32 respectively. The control circuit 33 is also provided with an output signal of an oxygen sensor 34 which is mounted in an exhaust manifold 38. The oxygen sensor 34 produces an output signal whose voltage level $VO_2$ corresponds to the oxygen concentration of the exhaust gas and increases as the oxygen concentration increases.

In addition to the drive circuits 31 and 32 and the oxygen sensor 34, a Pc vacuum switch 35, a $P_B$ vacuum switch 36, and a rotational speed switch 37 are connected to the control circuit 33. The Pc vacuum switch 35 turns on when the magnitude of the vaccum Pc in the vacuum detection hole 14 is smaller than a predetermined level $P_1$ (30 mmHg for example). The $P_B$ vacuum switch 36 turns on when the magnitude of the vacuum $P_B$ in the intake manifold 15 is smaller than a predetermined level $P_2$ (100 mmHg for example). The rotational speed switch 37 turns on when the rotational speed of the engine falls in a range between predetermined rotational speeds $N_1$ and $N_2$. The vacuum switches 35, 36, and the rotational speed switch 37 respectively produce a high level signal having a voltage level $V_H$ when turned on.

Figure 2:
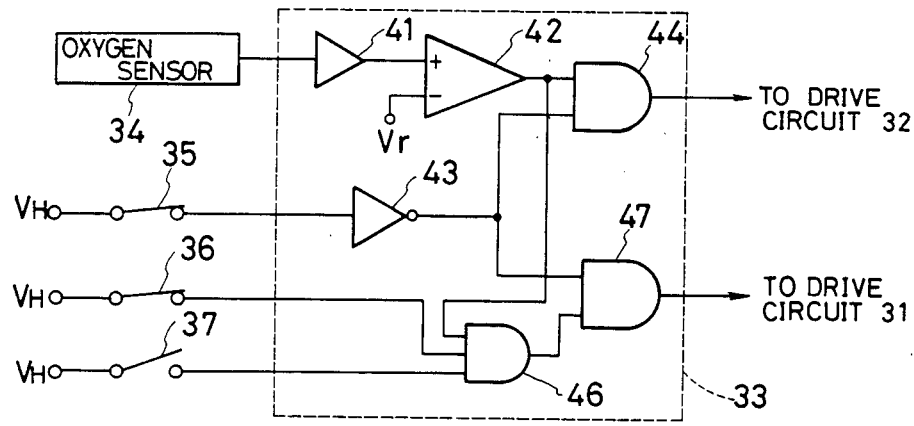
FIG. 2 is a block diagram showing the construction of the control circuit 33 of the system shown in FIG. 1.

As shown in FIG. 2, the control circuit 33 is made up of a comparator 42 for comparing the output signal $VO_2$ of the oxygen sensor 34 supplied through a buffer 41 with a predetermined reference voltage Vr corresponding to the stoichiometric value of air-fuel ratio, an inverter 43 connected to an output terminal of the PC vacuum switch 35, an AND circuit 44 for calculating a logical AND between the output signals of the inverter 43 and the comparator 42, an AND circuit 46 for calculating a logital AND among the output signals of the comparator 42, the $P_B$ vacuum switch 36 and the rotational speed switch 37, and an AND circuit 47 for calculating a logical AND between the output signals of the inverter 43 and the AND circuit 46. An output signal of the AND circuit 44 is supplied to the drive circuit 32 and an output signal of the AND circuit 47 is supplied to the drive circuit 31.

The operation of the thus constructed air-fuel ratio control system of the invention will be explained hereinafter.

When the air-fuel ratio is rich, the output signal level $VO_2$ of the oxygen sensor 34 becomes equal to or higher than the reference level Vr ($VO_2 \geq Vr$). Therefore, in the control circuit 33, the comparator 42 produces a high level output signal. Conversely, when the air-fuel ratio is lean, the output signal level $VO_2$ of the oxygen sensor 34 becomes lower than the reference voltage Vr ($VO_2 < Vr$). In this condition, the comparator 42 produces a low level output signal. During a normal operating condition of the engine where the engine has warmed up, the Pc vacuum switch 35 is turned off and the inverter 43 produces a high level output signal. Accordingly the variation of the level of the output signal of the AND circuit 44 becomes identical to the variation of the level of the output signal of the comparator 42. Thus, when the rich air-fuel mixture is detected in terms of the level of the output signal of the oxygen sensor 38, the AND circuit 44 produces a high level output signal which in turn is supplied to the drive circuit 32 as a first rich signal. When the air-fuel ratio is detected to be lean in terms of the output signal of the oxygen sensor 34, the AND circuit produces a low level output signal which, in turn, is supplied to the drive circuit 32 as a first lean signal.

When the first rich signal is applied to the drive circuit 32, the solenoid 19a is energized to open the solenoid valve 19. Conversely, when the first lean signal is supplied to the drive circuit 32, the solenoid 19a of the solenoid valve 19 is deenergized and the solenoid valve 19 is closed.

When the solenoid valve 19 is opened from the closed state, communication through the air intake side secondary air supply passage 17 is made and the secondary air is introduced into the intake manifold 15 through the orifice 20 of the air intake side secondary air supply passage 17 and the solenoid valve 19. In this state, the vacuum $P_B$ in the intake manifold 15 is supplied to the vacuum chamber 18a through the solenoid valve 19 of the air intake side secondary air passage 17, the orifice 24 of the pressure supply passsage 21a, the non-return valve 22 and the surge tank 29. Since the pressure in the vacuum chamber 18a gradually increases to reach the vacuum $P_B$ due to the effect of the residual pressures in the vacuum chamber 18a, the surge tank 29, the opening degree of the air control valve 18, that is, the sectional area of the air intake side secondary air supply passage 16 gradually increases. Thus the amount of the air intake side secondary air is gradually increased. In this way, the secondary air respectively flowing through the air intake side secondary air supply passages 16 and 17 are added together and supplied to the engine 4, to shift the air-fuel ratio to the lean side. The amount of the secondary air supplied to the engine 4 gradually increases with time. In this state, the vacuum $P_B$ operates to close the non-return valve 23 and accordingly the pressure supply passage 21b is closed. Further, the vacuum $P_B$ is diluted by the atomspheric air flowing in the air intake side secondary air supply passage 17, from the air cleaner 2 and the atmospheric pressure supply passage 26. The magnitude of the dilution is determined by the size of the orifices 20, 27 and large fluctuation of the vacuum $P_B$ supplied to the vacuum chamber 18a is prevented.

When, on the other hand, the solenoid valve 19 is closed from the open state, the air intake side secondary air supply passage 17 is closed immediately. Therefore, the atmospheric pressure is supplied to the vacuum chamber 18a through the orifice 20 of the air intake side secondary air supply passage 17, the orifice 25 of the pressure supply passage 21b, and the non-return valve 23. The pressure in the vacuum chamber 18a rapidly approaches the atmospheric pressure level due to the effects of the residual pressure of the vacuum chamber 18a and the orifices 20 and 25, without being affected by the residual vacuum of the surge tank 29. Therefore, the opening degree of the air control valve 18, that is, the sectional area of the air intake side secondary air supply passage 16, rapidly decreases to reduce the amount of the air intake side secondary air. In other words, when the air intake side secondary air supply passage 17 is closed, the secondary air is still supplied to the engine 4 through the air intake side secondary air supply passage 16 and the amount of the secondary air is decreased with time. When the solenoid valve 19 is closed, the non-return valve 22 is closed by the atmospheric pressure supplied to the vacuum chamber 18a. Therefore, the pressure supply passage 21a is closed and the atmospheric pressure is supplied to the vacuum chamber 18a without passing through the surge tank 29. For this reason, the speed of the decrease of the secondary air is greater than the speed of the increase of the secondary air.

When the air-fuel ratio is controlled by a feedback control operation, the first rich signal and the first lean signal are produced alternately and without interruption. Therefore, in the air intake side secondary air supply passage 16, the amount of the secondary air increases during the presence of the first rich signal, and decreases during the presence of the first lean signal. Thus, the integral (I) control is performed. In the air intake side secondary air supply passage 17, the secondary air flows intermittently and the proportional control (P) takes place. Therefore, the amount of the secondary air supplied to the intake manifold becomes a sum of a proportional control part and an integral control part.

On the other hand, when the vacuum $P_B$ in the intake manifold 15 becomes lower than the predetermined vacuum level $P_2$ under the high load condition, the $P_B$ vacuum switch is turned on and the high level signal is supplied from the $P_B$ vacuum switch 36 to the AND circuit 46. In this state, if the engine rotational speed $N_e$ is in the range between the predetermined rotational speeds $N_1$ and $N_2$, the rotational speed switch 37 turns on and the high level signal is provided to the AND circuit 46. Since the AND circuit 46 is supplied with the output signal of the comparator 42, the variation of the output signal level of the AND circuit 47 becomes identical to the variation of the output signal of the comparator 42. When the air-fuel ratio feedback control is performed in terms of the variation of the air intake side secondary air as mentioned before, the output signal level of the inverter 43 is high since the Pc vacuum switch 35 is turned off in this state. Therefore, the variation of the output signal level of the AND circuit 47 becomes identical to the variation of the output signal level of the comparator 42 with the supply of the output signal of the AND circuit 46.

Accordingly, when the air-fuel ratio is detected to be rich in terms of the output signal level of the oxygen sensor 34, the output signal level of the AND circuit 44 as well as the output signal level of the AND circuit 47 becomes high. This high level output signal is supplied to the drive circuit 31 as a second rich signal. If, on the other hand, the air-fuel ratio is detected to be lean in terms of the output signal of the oxygen sensor 34, the output signal level of the AND circuit 47 becomes low and the low level output signal of the AND circuit 47 is supplied to the drive circuit 31 as a second lean signal.

The drive circuit 31 operates to close the solenoid valve 12 in response to the second rich signal so as to close the slow speed fuel supply passage 11. In response to the second lean signal, the drive of the solenoid valve 12 is stopped (the solenoid valve 12 is opened) so as provide a communication through the slow speed fuel supply passage. The second rich signal is produced at the same time as the first rich signal and the second lean signal is produced at the same time as the first lean signal. Therefore, during the high load operating condition of the engine, the second rich signal and the second lean signal are produced alternately. Upon presence of the second rich signal, the supply of the fuel through the slow speed circuit is stopped and the fuel through the slow speed circuit is supplied to the engine through the slow port 9 and the idle port 10 upon presence of the second lean signal. Therefore, the feedback control of the air-fuel ratio is performed in terms of the supply of the fuel through the slow speed circuit as well as the air intake side secondary air, so that the air-fuel ratio is controlled at the stoichiometric value.

Next, if and when the operating condition of the engine enters into a decelerating state due to the closure of the throttle valve 5 or into a high load state due to a substantially fully open state of the throttle valve 5, the magnitude of the vacuum Pc supplied through the vacuum detection hole 14 to the Pc vacuum switch 35 becomes lower than the predetermined level so that the high level output signal is supplied from the Pc vacuum switch to the inverter 43. Therefore, the inverter 43 produces a low level output signal. In this state, the AND circuits 44 and 47 provide low level output signals to the drive circuits 32 and 31 respectively, irrespective of the output signal level of the comparator 42, i.e., the output signal level of the oxygen sensor 34.

In this state, the control circuit 33 operates to stop the driving of the solenoid valve 19 as in the case of the application of the first lean signal. Therefore, the solenoid valve 19 is closed so that the atmospheric pressure is continuously supplied to the pressure chamber 18a of the air control valve 18, to close both of the air intake side secondary air supply passages 16 and 17. Also, the drive circuit 31 stops to close the solenoid valve 12 as in the case of the application of the second lean signal and the communication through the slow speed fuel supply passage 11 is made. In this way, the feedback control of the air-fuel ratio is stopped and the air-fuel ratio is made rich.

Figure 3:
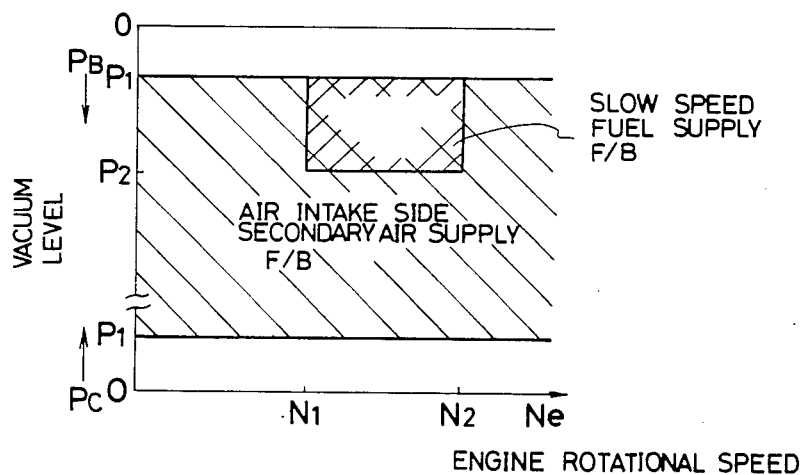
FIG. 3 is a diagram showing a range of the air-fuel ratio control in which the air-fuel ratio is controlled via the fuel through the slow speed circuit.

In summary, as shown in FIG. 3, according to the first feature of the present invention, the feedback (F/B) control of the air-fuel ratio in terms of the air intake side secondary air is performed when the vacuum Pc is greater than the predetermined pressure $P_1$. On the other hand, if the vacuum $P_B$ is greater than the predetermined vacuum $P_1$ which is smaller than the predetermined value $P_2$, and at the same time the rotational speed of the engine $N_e$ is in a range between the predetermined rotational speeds $N_1$ and $N_2$, the feedback control of the air-fuel ratio in terms of the supply of the fuel through the slow speed circuit as well as the supply of the air intake side secondary air is performed.

Figure 4:
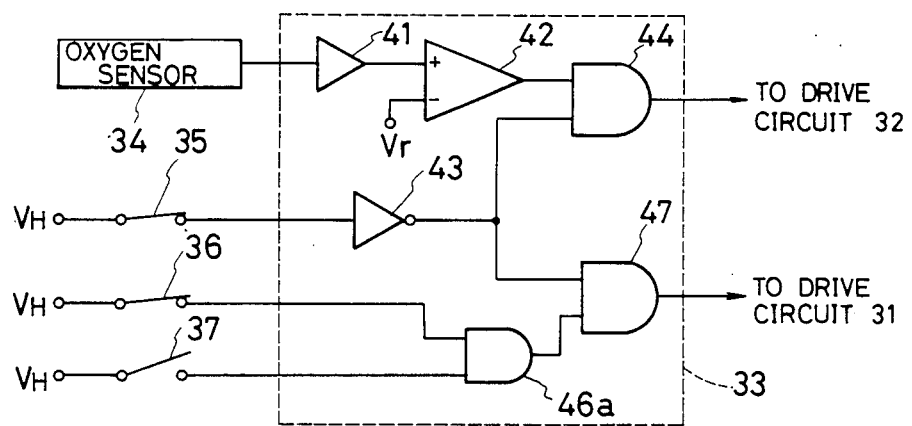
FIG. 4 is a block diagram showing the construction of the control circuit 33 used in a second embodiment of the air-fuel ratio control system of the present invention.

FIG. 4 shows the circuit construction of a second embodiment of the control circuit 33 of the air-fuel ratio control system of the present invention.

As shown in this figure, there is provided an AND circuit 46a which calculates the logical AND between the output signal of the $P_B$ vacuum switch 36 and the rotational speed switch 37. The AND circuit 47 calculates the logical AND state between the output signal levels of the AND circuit 46a and the inverter 43. The other portion of the circuit construction of this control circuit is identical with the control circuit of FIG. 2 and the explanation of those portions is omitted. Also, the construction of the other portion of the air-fuel ratio control system is the same as the structure explained in connection with the previous example, and the explanation thereof is omitted.

In this example, the feedback control of the air-fuel ratio in terms of the air intake side secondary air is performed when the vacuum Pc is greater than the predetermined pressure level $P_1$. When the vacuum $P_B$ is smaller than the predetermined pressure level $P_2$ and greater than the predetermined pressure level $P_1$ being equal to the vacuum Pc, and the rotational speed of the engine $N_e$ is in the range between the predetermined rotational speeds $N_1$ and $N_2$ at the same time, the feedback control of the air-fuel ratio is performed in terms of the control of the supply of the air intake side secondary air, while the supply of the fuel through the slow speed circuit is stopped.

It will be appreciated from the foregoing that, according to the first embodiment of the present invention, the air-fuel ratio control is operated such that the feedback control of the supply of air intake side secondary air is one in which the air intake side secondary air is supplied in response to the result of detection of the air-fuel ratio by means of the composition of the exhaust gas and is performed during a predetermined operating condition of the engine, and the supply of the fuel through the slow speed circuit is controlled in response to the detected result of the air-fuel ratio. According to the second embodiment of the present invention, the feedback control of the air-fuel ratio by control of the supply of the air intake side secondary air is performed while the operation of the slow speed circuit of the fuel supply system is stopped, under the predetermined operating condition of the engine.

Therefore, even if the rate of the introduction of the air intake side secondary air into the intake manifold becomes low under the high load condition of the engine, due to the fall of the vacuum level in the intake manifold, the air-fuel ratio is controlled in terms of the fuel supply through the slow speed circuit. Therefore, an over-rich mixture is prevented so that the chance of the emission of the noxious components of the exhaust gas is greatly reduced.

Further, it should be noted that the predetermined operating condition of the engine which is used as a factor for changing the mode of control, may be determined in terms of the magnitude of the vacuum in the intake manifold and the vehicle speed, although in the preferred embodiments the predetermined operating condition was the high load operation of the engine which is determined in terms of the vacuum in the intake manifold (vacuum of downstream of the throttle valve) and the rotational speed of the engine.

What is claimed is:

1. An air-fuel ratio control system which is operative to control the air intake side secondary air supply for an internal combustion engine having a fuel supply system including a carburetor with a slow speed fuel supply circuit which opens into an intake passage at a position near a throttle valve in the engine when said throttle valve is substantially fully closed, said control system including a feedback control means in which air intake side secondary air is supplied to the carburetor, on the downstream side of the throttle valve, in response to a result of a detection of an air-fuel ratio by means of an oxygen concentration sensor which senses the oxygen concentration of an exhaust gas of the engine, said control system further including control means for actuating said feedback control means to perform an air-fuel ratio control of air intake side secondary air supply and for substantially eliminating the operation of said slow speed fuel supply circuit of the fuel supply system in response to the result of the detection of the air-fuel ratio, under a high load operating condition of the engine in which the magnitude of the vacuum in said intake passage on the downstream side of the throttle valve is low.

2. An air-fuel control system which is operative to control the air intake side secondary air supply to an internal combustion engine having a fuel supply system including carburetor with a slow speed fuel supply circuit which opens into an intake passage at a position near a throttle valve in the engine when said throttle valve is substantially fully closed, said control system including a feedback control means in which air intake side secondary air is supplied to the carburetor, on the downstream side of the throttle valve, in response to a result of the detection of an air-fuel ratio by means of an oxygen concentration sensor which senses the oxygen concentration of an exhaust gas of the engine, said control system further including control means for actuating said feedback control means to perform an air-fuel ratio control of air intake side secondary air supply, and for stopping the operation of said slow speed fuel supply circuit of the fuel supply system, under a high load operating condition of the engine in which the magnitude air-fuel ratio is rich.

* * * * *